(12) United States Patent
Gollamudi et al.

(10) Patent No.: US 6,915,477 B2
(45) Date of Patent: Jul. 5, 2005

(54) DELAY SENSITIVE ADAPTIVE QUALITY CONTROL LOOP FOR RATE ADAPTATION

(75) Inventors: Sridhar Gollamudi, Pine Brook, NJ (US); Pantelis Monogioudis, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 485 days.

(21) Appl. No.: 10/033,335

(22) Filed: Dec. 28, 2001

(65) Prior Publication Data

US 2003/0126536 A1 Jul. 3, 2003

(51) Int. Cl.[7] .............................................. H03M 13/00
(52) U.S. Cl. .................. 714/774; 375/232; 375/240.27
(58) Field of Search .............................. 714/774, 776, 714/747, 749, 750, 708; 375/232, 240.27, 130; 370/329; 702/100

(56) References Cited

U.S. PATENT DOCUMENTS

| | | | | |
|---|---|---|---|---|
| 5,600,663 A | * | 2/1997 | Ayanoglu et al. | 714/774 |
| 5,699,365 A | * | 12/1997 | Klayman et al. | 714/708 |
| 6,111,863 A | * | 8/2000 | Rostoker et al. | 370/329 |
| 6,292,516 B1 | * | 9/2001 | Petsko et al. | 375/267 |
| 6,308,294 B1 | * | 10/2001 | Ghosh et al. | 714/751 |
| 6,314,535 B1 | * | 11/2001 | Morris et al. | 714/708 |
| 6,366,601 B1 | * | 4/2002 | Ghosh et al. | 375/130 |
| 6,434,129 B1 | * | 8/2002 | Struhsaker et al. | 370/329 |
| 6,539,031 B1 | * | 3/2003 | Ngoc et al. | 370/470 |
| 6,574,769 B1 | * | 6/2003 | Ramaswamy et al. | 714/776 |
| 6,658,019 B1 | * | 12/2003 | Chen et al. | 370/465 |
| 6,671,416 B2 | * | 12/2003 | Vishwanath et al. | 382/253 |
| 6,738,370 B2 | * | 5/2004 | Ostman | 370/349 |

OTHER PUBLICATIONS

Kang et al., "Region and Time Based Unequal Error Protection for Video Transmission over Mobile Links", IEEE Circuits and Systems 1999, vol. 4, pp 511–514, May 30, 1999 to Jun. 2, 1999.*

* cited by examiner

Primary Examiner—Guy J. Lamarre
Assistant Examiner—John P. Trimmings
(74) Attorney, Agent, or Firm—Jimmy Goo

(57) ABSTRACT

An adaptive quality control loop for link rate adaptation that selectively adjusts channel condition thresholds based on delay sensitivity of data packets being transmitted. For wireless communication systems incorporating an error correction scheme using re-transmissions, the quality control loop adaptively adjusts channel condition thresholds more frequently for delay sensitive data packets, such as video, and less frequently for delay insensitive data packets, such as text messaging. Channel condition thresholds may be adjusted using fixed or variable steps based on error detection results.

20 Claims, 3 Drawing Sheets

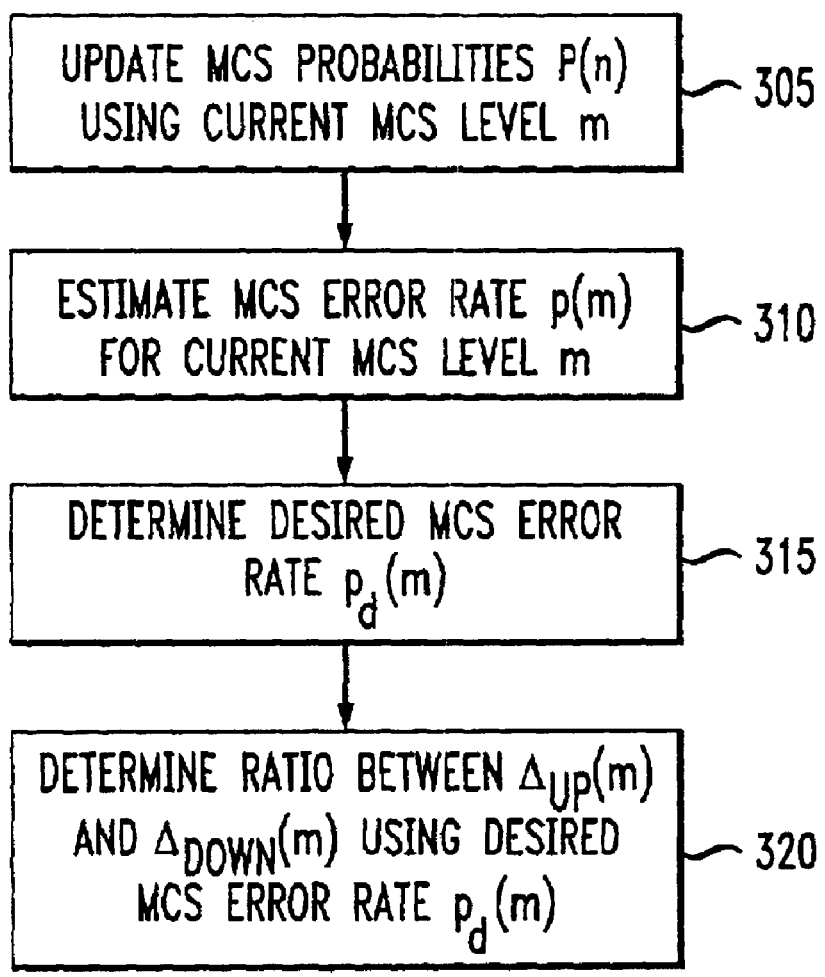

DELAY SENSITIVE ADAPTIVE QUALITY CONTROL LOOP FOR RATE ADAPTATION

RELATED APPLICATION

Related subject matter is disclosed in the following applications filed concurrently and assigned to the same assignee hereof: U.S. patent application Ser. No. 10/033,339 entitled, "ADAPATIVE QUALITY CONTROL LOOP FOR LINK RATE ADAPTATION IN DATA PACKET COMMUNICATION," inventors Sridhar Gollamudi and Pantelis Monogioudis; and U.S. patent application Ser. No. 10033338 entitled, "MULTI-CHANNEL ADAPATIVE QUALITY CONTROL LOOP FOR LINK RATE ADAPTATION IN DATA PACKET COMMUNICATION," inventors Sridhar Gollamudi and Pantelis Monogioudis.

FIELD OF THE INVENTION

The present invention relates generally to wireless data packet communications and, in particular, to performing quality control for wireless data packet communications.

BACKGROUND OF THE RELATED ART

In data packet communications over time-varying wireless communication channels, rate adaptation may be used to optimize data transmission. Rate adaptation is a technique that involves dynamically selecting a data rate for each packet of data to be transmitted based on a latest estimate of channel condition. Different data rates are associated with different modulation and/or channel coding schemes, also referred to herein as "MCS levels". High data rates are associated with higher order modulation and/or weaker channel coding schemes that provide less protection, such as redundancy, against channel error for the data packet being transmitted. By contrast, low data rates are associated with lower order modulation and/or stronger channel coding schemes that provide more protection against channel error for the data packet being transmitted.

The objective of rate adaptation is to select a data rate or an associated MCS level that would maximize data throughput without compromising data transmission quality. In good channel conditions, data transmission quality is less likely to be affected, thus a weaker MCS level may be selected to achieve a higher data rate. By contrast, in poor channel conditions, data transmission quality is more likely to be affected and a stronger MCS level should be selected to provide greater protection for the data packet being transmitted.

An MCS level (or data rate) is typically selected from a lookup table of MCS levels (or data rates) associated with channel conditions thresholds. In the lookup table, high or weak MCS levels and high channel condition thresholds are associated with high data rates. Similarly, low or strong MCS levels and low channel condition thresholds are associated with low data rates. The channel conditions between a transmitter and a receiver are estimated at the receiver using any channel quality metric, such as carrier to interference (C/I) ratio, signal to interference plus noise ratio (SINR) or Shannon capacity. The estimate of channel condition is subsequently relayed, via a feed back channel, to the transmitter. The transmitter uses the estimate of channel condition and lookup table to select an MCS level at which the transmitter is to transmit data packets to the receiver. In order to maximize data throughput, the MCS level selected should be the MCS level associated with the highest channel condition threshold which the estimate of channel condition satisfies. A channel condition threshold is satisfied when the estimate of channel condition is greater or equal to the channel condition threshold. The selected MCS level is communicated to the receiver by the transmitter before any data packet is transmitted. Alternately, the receiver selects the MCS level and relays, via the feedback channel, the selected MCS level to the transmitter.

The choice of channel condition thresholds in the lookup table can significantly affect link performance criteria, such as average throughput, packet and bit error rates and average number of retransmissions with ARQ, HARQ or similar error correction schemes. Optimal choice of channel condition thresholds are based on a complicated function of several factors such as metric estimation accuracy, Doppler frequency of the channel, feedback delay, fading statistics and SINR at the receiver, channel profile, choice of MCS levels, and transmitter and receiver design. Most of these factors are, however, time varying which would, in turn, cause the optimal channel condition thresholds to be time varying. Thus, it would be more desirable for a lookup table having channel condition thresholds that are adaptive as time varies (i.e., adaptive lookup table) than a lookup table having fixed channel condition thresholds (i.e., fixed lookup table). One way of implementing an adaptive lookup table involves measuring the above mentioned factors in real-time, calculating a set of optimized channel condition thresholds based on those factors and updating the adaptive lookup table with the set of optimized channel condition thresholds. However, due to the large number of factors affecting the optimal channel condition thresholds, it would be impractical to implement an adaptive lookup table in this manner.

One practical implementation of an adaptive lookup table would involve selectively adjusting the adaptive lookup table to decrease the number of adjustments or updates to the adaptive lookup table, thereby decreasing the number of times the aforementioned factors need to be measured in real-time. Accordingly, there exists a need for selectively adjusting channel condition thresholds.

SUMMARY OF THE INVENTION

The present invention is an adaptive quality control loop for link rate adaptation that selectively adjusts channel condition thresholds based on delay sensitivity of data packets being transmitted. For wireless communication systems incorporating an error correction scheme using re-transmissions, the present invention adaptively adjusts channel condition thresholds more frequently for delay sensitive data packets, such as video, and less frequently for delay insensitive data packets, such as text messaging. Channel condition thresholds may be adjusted using fixed or variable steps based on error detection results. In one embodiment, the present invention comprises the step of determining a delay sensitivity type for a data packet, and adjusting a channel condition threshold associated with a modulation and coding scheme (also referred to as "MCS levels) used in a transmission of the data packet. The channel condition threshold is adjusted using an up step or down step depending on an error detection result associated with the transmission of the data packet. If the data packet is determined to be a delay sensitive data packet, the channel condition threshold is adjusted in response to each error detection result associated with a transmission or a re-transmission of the data packet. If the data packet is determined to be a delay insensitive data packet, the channel condition threshold is adjusted in response to the error detection result associated with the last transmission of the data packet.

BRIEF DESCRIPTION OF THE DRAWINGS

The features, aspects, and advantages of the present invention will become better understood with regard to the following description, appended claims, and accompanying drawings where:

FIG. 3 depicts a flowchart illustrative of one embodiment of determining variable up steps $\Delta_{Up}$ (n) and down steps $\Delta_{Down}$ (n) using modulation and/or coding schemes (MCS) probabilities P(n) and MCS error rate p(n).

DETAILED DESCRIPTION

Figure 1:
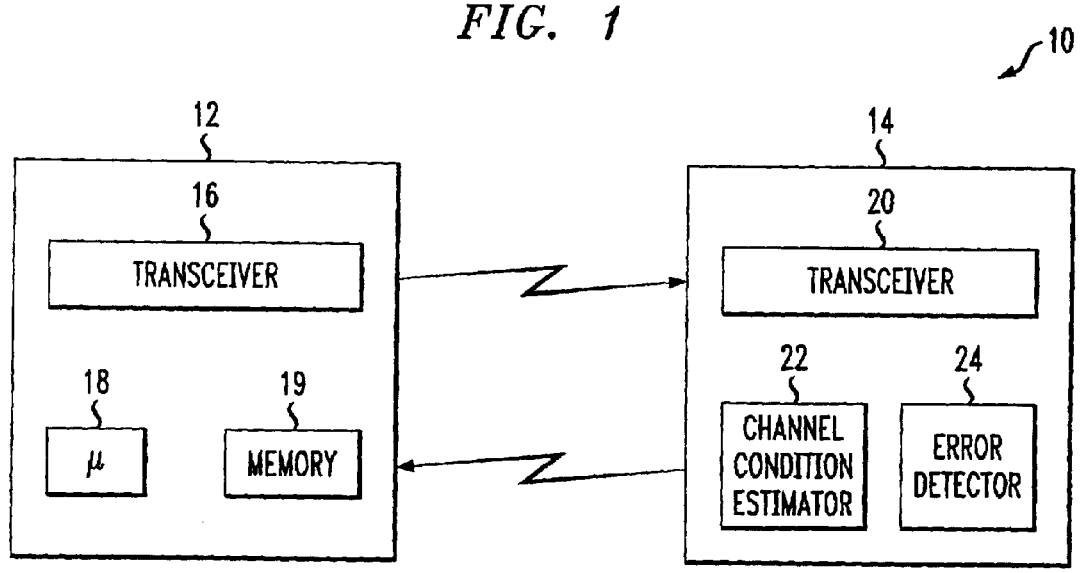
FIG. 1 depicts a wireless communication system used in accordance with the present invention.

The present invention is an adaptive quality control loop for link rate adaptation that selectively adjusts channel condition thresholds based on delay sensitivity of data packets being transmitted. For wireless communication systems incorporating an error correction scheme using re-transmissions, the present invention adaptively adjusts channel condition thresholds more frequently for delay sensitive data packets, such as video, and less frequently for delay insensitive data packets, such as text messaging. Channel condition thresholds may be adjusted using fixed or variable steps based on error detection results FIG. 1 depicts a wireless communication system 10 used in accordance with the present invention. Wireless communication system 10 incorporates a multiplexing scheme, such as code division multiple access (CDMA), time division multiple access (TDMA), etc. Wireless communication system 10 comprises a transmitter 12 and a receiver 14. Transmitter 12 includes a transceiver 16 for transmitting and receiving data over an air interface, and a processor 18 with associated memory 19 for determining a particular MCS level at which to transmit data packet. Receiver 14 includes a transceiver 20 for receiving and transmitting data over an air interface, a channel condition estimator 22 for estimating channel conditions between transmitter 12 and receiver 14, and an error detector 24 for detecting error in received data packet. Note that processor 18 and memory 19 may, alternately, be parts of receiver 14 or of an independent entity in communication with both receiver 14 and transmitter 12. Thus, the present invention should not be limited to a wireless communication system in which processor 18 and memory 19 are parts of transmitter 12.

Figure 2:
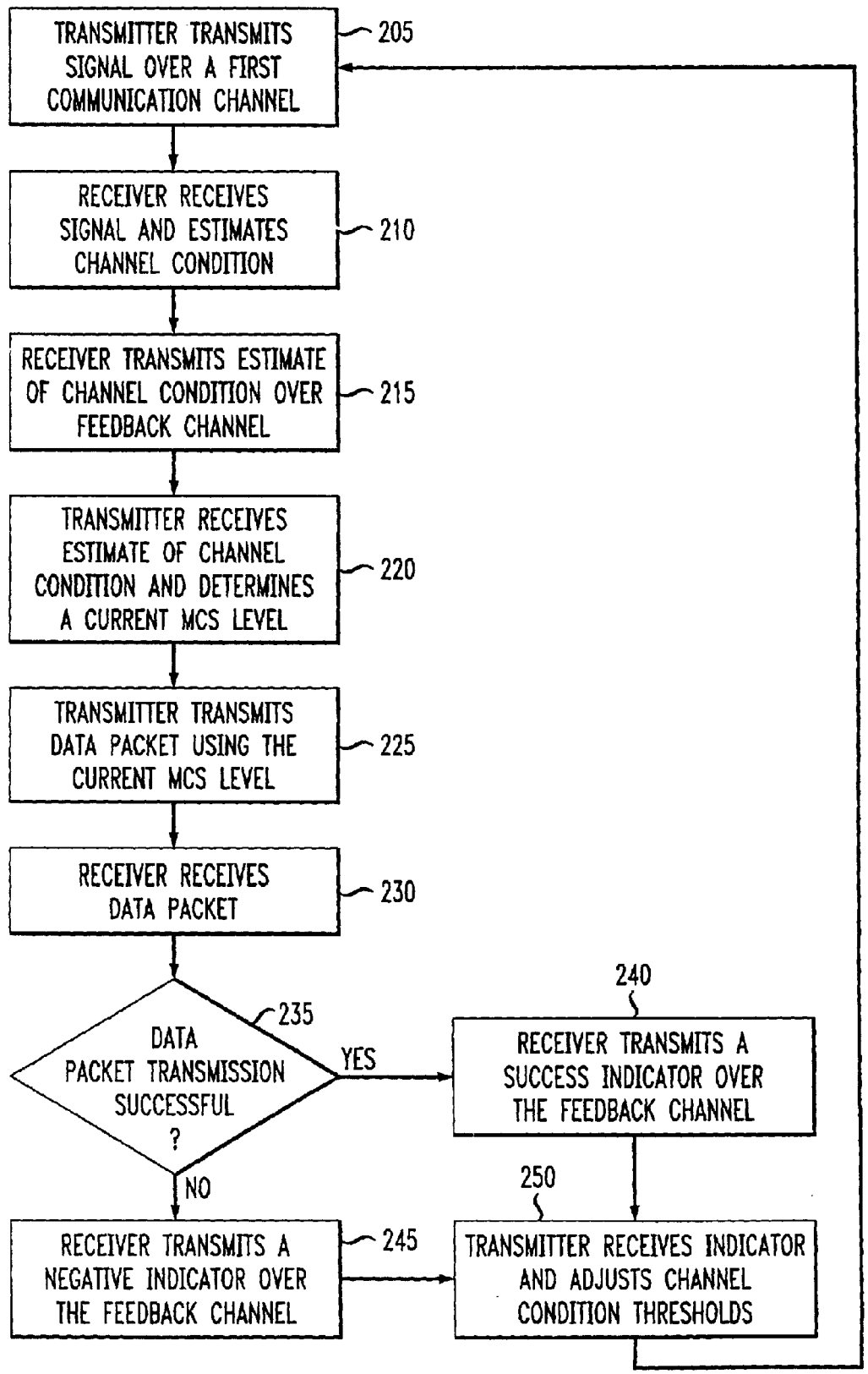
FIG. 2 depicts a flowchart illustrative of an adaptive quality control loop in accordance with one embodiment of the present invention.

FIG. 2 depicts a flowchart 200 illustrative of an adaptive quality control loop in accordance with one embodiment of the present invention. In step 205, transmitter 12 transmits a signal over a first communication channel, wherein the signal may be any signal which channel condition estimator 22 can use to estimate channel conditions between transmitter 12 and receiver 14, such as a pilot signal or beacon frequency signal. In step 210, receiver 14 receives the signal and channel condition estimator 22 estimates the channel condition between transmitter 12 and receiver 14 using the received signal. The estimate of channel condition is transmitted by receiver 14, in step 215, over a feedback channel to transmitter 12.

In step 220, transmitter 12 receives the estimate of channel condition and processor 18 uses such estimate to determine a current MCS level m (or data rate). In one embodiment, the current MCS level m is selected from a table of MCS levels n stored in memory 19, where $1 \leq n$, $m \leq M$. Each of the MCS levels n correspond to a channel condition threshold $\theta(n)$. Higher or weaker MCS levels n are associated with higher channel condition thresholds $\theta(n)$ and data rates, whereas lower or stronger MCS levels n are associated with lower channel condition thresholds $\theta(n)$ and data rates. For channel conditions greater than or equal to a particular channel condition threshold $\theta(n)$, a data packet can probably be reliably transmitted to receiver 14 using the MCS levels n associated with that particular or lower channel condition threshold $\theta(n)$. For example, if the estimate of channel condition is greater than channel condition threshold $\theta(3)$, then a data packet can deem to be reliably transmittable using MCS level 3, 2 and 1. Preferably, processor 18 selects the MCS level n associated with the highest channel condition threshold $\theta(n)$ which the estimate of channel condition satisfies, i.e., is greater than or equal to, as the current MCS level m.

Channel condition threshold $\theta(n)$ may, in one embodiment, be initially determined based on a complex function of several factors such as metric estimation accuracy, Doppler frequency of the channel, feedback delay, fading statistics and SINR at the receiver, channel profile, choice of MCS levels, and transmitter and receiver design, as is well-known in the art.

In step 225, transmitter 12 transmits data packet to receiver 14 using the current MCS level m over the first communication channel or another communication channel. In step 230, receiver 14 receives the data packet. In step 235, error detector 24 determines whether the data packet transmission was successful, i.e., data packet could be successfully decoded at receiver 14 to obtain an error detection result. In one embodiment, error detector 24 performs a cyclical redundancy check (CRC) on the data packet, as is well-known in the art. If the CRC is successful, then error detector 24 determines that the error detection result is positive, i.e., data packet transmission was successful. If the CRC fails, then error detector 24 determines that the error detection result is negative, i.e., data packet transmission failed.

If error detector 24 detects a successful data packet transmission, then receiver 14 transmits a success indicator over the feedback channel (or some other communication channel) to transmitter 12 indicating a positive error detection result, in step 240. If error detector 24 detects a failed data packet transmission, then receiver 14 transmits a failure indicator over the feedback channel (or some other communication channel) to transmitter 12 indicating a negative error detection result, in step 245.

From step 240 or 245, flowchart 200 proceeds to step 250 where processor 18 updates channel condition threshold $\theta(m)$ and, perhaps, channel condition thresholds $\theta(m)$ in the table in memory 19 before returning to step 205. Note that a re-transmission of a data packet may occur at a MCS level different from the preceding transmission of the same data packet if the channel condition changes.

Updating channel condition threshold $\theta(m)$ (or other channel condition thresholds $\theta(n)$) involves the following. Generally, if a success indicator is received, the channel condition threshold $\theta(m)$ associated with the current MCS level m is decreased a down step $\Delta_{Down}(m)$, i.e., the channel condition threshold $\theta(m)$ is lowered. By contrast, if a failure indicator is received, the channel condition threshold $\theta(m)$ associated with the current MCS level m is increased an up step $\Delta_{Up}(m)$, i.e., the channel condition threshold $\theta(m)$ is increased. In addition to adjusting the channel condition threshold $\theta(m)$ of the current MCS level m, the channel condition thresholds θ(n) of other MCS levels n may also be adjusted, as will be described herein. Note that, when increasing or decreasing channel condition thresholds θ(n), the channel condition thresholds being increased or decreased should not be increased above or decreased below their adjacent channel condition thresholds. That is, for example, channel condition threshold θ(2) should not be decreased below channel condition threshold θ(1) nor increased above channel condition threshold θ(3).

Many variations of the up step $\Delta_{Up}$ and down step $\Delta_{Down}$ may exist for the present invention. Some of these variations will be described herein. This should not, however, be construed to be inclusive of all possible variations of up steps $\Delta_{Up}$ and down steps $\Delta_{Down}$ for the present invention. The down step $\Delta_{Down}(m)$ for channel condition threshold θ(m) may be equal to or different from the up step $\Delta_{Up}(m)$ for the same channel condition threshold θ(m). The up step $\Delta_{Up}(n)$ and down step $\Delta_{Down}$ may be the same, different or some combination thereof across all channel condition thresholds θ(n). For example, the up step $\Delta_{Up}(1)$ for channel condition threshold θ(1) may be the same or different than the up step $\Delta_{Up}(2)$ for channel condition threshold θ(2).

The up steps $\Delta_{Up}(n)$ and down steps $\Delta_{Down}(n)$ may be of fixed or variable sizes for a particular or all channel condition thresholds θ(n). In one embodiment, channel condition thresholds θ(n) are adaptively adjusted using variable up steps $\Delta_{Up}(n)$ and down steps $\Delta_{Down}(n)$. The variable up steps $\Delta_{Up}(n)$ and down steps $\Delta_{Down}(n)$ may be determined in a variety of manners. FIG. 3 depicts a flowchart 300 illustrative of one embodiment of determining variable up steps $\Delta_{Up}(n)$ and down steps $\Delta_{Down}(n)$ using MCS probabilities P(n) for choosing a particular MCS level n and MCS error rates p(n). The MCS probability P(n) for choosing a particular MCS level n is the probability that a data packet is transmitted with that MCS level n to a particular receiver. In other words, it is the fraction of times that MCS level n is selected for data packet transmission to a particular receiver. The MCS error rate p(n) is the probability that a data packet transmitted using MCS level n would not be received successfully by a particular receiver In step 305, MCS probabilities P(n) for MCS levels n for receiver 14 are updated using the current MCS level m. In one embodiment, MCS probabilities P(n) are estimated using simple averaging. For example, suppose there are three MCS levels 1, 2 and 3, and MCS levels 1, 2 and 3 were chosen 3, 4 and 2 times, respectively, prior to choosing the current MCS level m. The MCS probabilities prior to the selection of the current MCS level m would then be estimated to be P(1)=0.33, P(2)=0.44 and P(3)=0.22. If the current MCS level m is 1, then the MCS probabilities P(n) would be updated such that P(1)=0.40, P(2)=0.40 and P(3)=0.20.

In another embodiment, MCS probabilities P(n) are estimated using exponential averaging. Specifically, the MCS probabilities P(n) are estimated using equation (1):

$$P(n) = \begin{cases} \lambda P'(n) + (1-\lambda) & \text{if } n = m \\ \lambda P'(n) & \text{otherwise} \end{cases} \quad \text{equation (1)}$$

where λ is a forgetting factor that is between 0 and 1 (usually closer to 1) and prime ' indicates the previous value of the associated parameter prior to update. The forgetting factor is a factor used to compute an average of a sequence of observations when the average itself is a slowly varying quantity, as is well-known in the art. The MCS probabilities P(n) may be estimated using other averaging schemes, such as computing an average over a sliding window. Thus, the present invention should not be limited to the above described techniques for estimating MCS probabilities P(n).

In step 310, MCS error rate p(m) for the current MCS level m is estimated. In one embodiment, MCS error rate P(m) is estimated using simple averaging. For example, if 50% of the data packet sent with MCS level 3 have CRC failures, then the MCS error rate for level 3 is p(3)=0.5. In another embodiment, MCS error rate p(m) is estimated using exponential averaging. Specifically, MCS error rate p(m) is estimated using equation (2).

$$p(m) = \begin{cases} \lambda p'(m) + (1-\lambda) & \text{if CRC fails} \\ \lambda p'(m) & \text{if CRC succeeds} \end{cases} \quad \text{equation (2)}$$

The MCS error rate p(m) may be estimated using other averaging schemes, such as computing an average over a sliding window. Thus, the present invention should not be limited to the above described techniques for estimating the MCS error rate p(m). Note that, in step 310, only the MCS error rate p(m) for the current MCS level m is estimated, and not MCS error rate p(n) for all MCS levels n. The reason for not updating the MCS error rate p(n) for other MCS levels n is because no new information is available at this time for the other MCS levels n. It should be understood that estimates for MCS error rates p(n) of MCS levels n other than MCS level m also exist.

In step 315, a desired MCS error rate p(m), denoted hereinafter as $p_d(m)$, is computed for current MCS level m, wherein the desired MCS error rate $p_d(m)$ would meet a target criterion. The desired MCS error rate $p_d(m)$ can either be computed using a target criterion based on a block error rate (BLER) or bit error rate (BER). An overall BLER, hereinafter denoted as $P_{BLER}$, is the rate of data packet or block errors, i.e., CRC errors, averaged over all MCS levels n. $P_{BLER}$ can be determined using equation (3)

$$P_{BLER} = \sum_{n=1}^{M} p(n)P(n) \quad \text{equation (3)}$$

where M is the total number of MCS levels.

An overall BER, hereinafter denoted as $P_{BER}$, is the rate of bit errors averaged over all MCS levels n. The number of bits in a data packet being determinative of $P_{BER}$. If a data packet is successfully decoded, then all bits are deemed successfully transmitted. If a data packet is not successfully decoded, then all bits are deemed to have been unsuccessfully transmitted. Thus, if a data packet with a large number of data bits can not be successfully decoded, such would increase $P_{BER}$ more than if a data packet with a smaller number of data bits can not be successfully decoded. By contrast, the number of data bits in a data packet is irrelevant from the perspective of determining $P_{BLER}$. $P_{BER}$ can be determined using equation (4), $$P_{BER} = \frac{\sum_{n=1}^{M} R(n)p(n)P(n)}{\sum_{n=1}^{M} R(n)P(n)} \quad \text{equation (4)}$$

where R(n) is the averaged transmitted data rate for MCS level n.

If the target criterion for the desired MCS error rate $p_d(m)$ is based on a constant target BLER $P_{BLER}^{Target}$, then the desired MCS error rate $p_d(m)$ is determined using equation (5).

$$p_d(m) = \frac{1}{P(m)}\left[P_{BLER}^{Target} - \sum_{n=1, n\neq m}^{M} p(n)P(n)\right] \quad \text{equation (5)}$$

If the target criterion is based on a constant target BER $P_{BER}^{Target}$, then the desired MCS error rate $p_d(m)$ is determined using equation (6).

$$p_d(m) = \quad \text{equation (6)}$$

$$\frac{1}{R(m)P(m)}\left[P_{BER}^{Target}\sum_{n=1}^{M} R(n)P(n) - \sum_{n=1,n\neq m}^{M} R(n)p(n)P(n)\right]$$

In step 320, the desired MCS error rate $p_d(m)$, whether based on BLER or BER, is used to determine a ratio between the sizes of the down step $\Delta_{Down}(m)$ and up step $\Delta_{Up}(m)$ for the current MCS level m. In one embodiment, the up-to-down step ratio for the current MCS level m is set to satisfy equation (7).

$$\frac{\Delta_{Up}(m)}{\Delta_{Down}(m)} = \frac{1 - p_d(m)}{p_d(m)} \quad \text{equation (7)}$$

Alternatively, the sizes for the up step $\Delta_{Up}$ and down step $\Delta_{Down}$ may be determined using equations (8) and (9), respectively:

$$\Delta_{Up}(m) = \mu(1-p_d(m)) \quad \text{equation (8)}$$

$$\Delta_{Down}(m) = \mu p_d(m) \quad \text{equation (9)}$$

where $\mu$ is a positive constant.

Another embodiment of determining variable up steps $\Delta_{Up}(n)$ and down steps $\Delta_{Down}(n)$ is applicable if the relative positions of the channel condition thresholds are unchanged, i.e., if at every update instant the same up and down steps are applied to all thresholds. In this embodiment, the variable up steps $\Delta_{Up}(n)$ and down steps $\Delta_{Down}(n)$ are determined based a constant target BER $P_{BER}^{Target}$ and average transmitted data rates R(n) using equations (10) and (11).

$$\Delta_{Up}(n) = \mu R(n)\left(1 - P_{BER}^{Target}\right) \quad \text{equation (10)}$$

$$\Delta_{Down}(n) = \mu R(n)P_{BER}^{Target} \quad \text{equation (11)}$$

Alternately, a constant target

BLER $P_{BLER}^{Target}$ may be used instead of the constant target

BER $P_{BER}^{Target}$.

The up step $\Delta_{Up}(m)$ and down step $\Delta_{Down}(m)$ are used accordingly in step 250 to adjust the corresponding channel condition threshold θ(m). In one embodiment, only the channel condition threshold θ(m) for the current MCS level m is adjusted in step 250. In another embodiment, one or more other channel condition thresholds θ(n) for MCS levels n other than MCS level m are also adjusted. For example, the other channel condition thresholds θ(n) being adjusted are adjusted the same amount as channel condition threshold θ(m) such that the relative distance between the channel condition thresholds θ(n) being adjusted, including channel condition threshold θ(m), remain fixed. Alternately, the other channel condition thresholds θ(n) are adjusted using up steps $\Delta_{Up}(n)$ and down steps $\Delta_{Down}(n)$ determined separately from up step $\Delta_{Up}(m)$ and down step $\Delta_{Down}(m)$.

When channel condition threshold θ(m) (and, if applicable, other channel condition threshold θ(n)) is adjusted in step 250 may depend on what type of error correction scheme is being implemented and delay sensitivity of the data packet being transmitted. For purposes of discussion, it is assumed that the error correction scheme is HARQ. This should not be construed to limit the present invention in any manner. In HARQ, error correction is implemented in the form of re-transmitting data packets that were not successfully decoded at receiver 14, i.e., CRC failed. Transmission and/or re-transmission of data packets are completed when the data packet has been successfully decoded, i.e., transmission successful, or when a maximum number of allowable re-transmissions has been reached. Data packets can be categorized, for example, into two types: delay sensitive and delay insensitive. Whether a data packet is delay sensitive or delay insensitive can be based on factors such as service provider preferences, user preferences, or some combination thereof. Once categorized, well-known techniques in the art can be used to determine which defined category a data packet belongs. For example, application level attributes are signaled to peer entity prior to data transmission such that the category of data packets can be determined. The categories may or may not be mutually exclusive.

In one embodiment where the data packet being transmitted is delay sensitive, such as video, the channel condition threshold θ(m) (and, if applicable, other channel condition thresholds θ(n)) is adjusted whenever a CRC result, such as a success or failure indicator, is available. The available CRC result determines whether the channel condition threshold θ(m) is adjusted up or down. For example, if the available (or latest) CRC result indicates data packet transmission error, then the channel condition threshold θ(m) is adjusted a down step. By adjusting the channel condition threshold θ(m) whenever a CRC result is available, the amount of delay is reduced, particularly when the data packet transmission failed. For example, suppose the estimate of channel condition is C1. MCS level 2 is selected as the MCS level to be used in data packet transmissions based on this channel condition C1. The data packet transmission fails. The transmitter will attempt to re-transmit the same data packet based on the latest estimate of channel condition, which is C2. In this example, channel condition C2 is approximately the same or worst than channel condition C1. If the channel condition threshold θ(m) was not adjusted an up step (because the original data packet transmission failed) prior to selecting an MCS level for the re-transmission of the data packet, the same MCS level 2 would be selected for the re-transmission. Such re-transmission using MCS level 2 under the channel condition C2 is likely to fail because it also failed under channel condition C1. By contrast, suppose the channel condition threshold θ(m) was adjusted an up step prior to selecting the MCS level for the re-transmission of the data packet, and the adjusted channel condition threshold θ(m) would no longer be satisfied by the channel condition C2. In this situation, a lower or stronger MCS level, i.e., MCS level 1, would be selected for the re-transmission of the data packet. The re-transmission using a stronger MCS level 1 is more likely to succeed than the re-transmission using MCS level 2 under the same channel condition C2, thereby reducing the amount of delay associated with a failed re-transmission attempt using MCS level 2.

In another embodiment where the data packet being transmitted is not delay sensitive, such as a text message, the channel condition threshold θ(m) (and, if applicable, other channel condition thresholds θ(n)) is adjusted after completion of any and all transmissions, including re-transmissions, of the data packet. Transmission of a data packet is deemed completed when a good CRC result is received or the number of re-transmissions is equal to the maximum number of allowable re-transmissions. The last CRC result associated with the data packet transmission may be used to determine whether the channel condition threshold θ(m) is adjusted up or down. Alternately, an average of the CRC results associated with all transmissions of the data packet are used to determine whether channel condition threshold θ(m) is adjusted up or down. For example, suppose three CRC results for a data packet transmission indicate there were two failed transmissions and one successful transmission. The average CRC result would indicate that the transmission of the data packet failed more often than it succeeded for the MCS level of the data packet transmission. Accordingly, the channel condition threshold θ(m) is adjusted an up step. In another example, two CRC results indicate one failed transmission and one successful transmission. The average CRC result would indicate neither success or failure were likely or unlikely for that MCS level. Based on the average CRC result, the channel condition threshold θ(m) may not be adjusted or adjusted using an up step or a down step depending on preferences established, for example, by a service provider.

The present invention has been described herein with reference to certain embodiment. This should not be construed to limit the present invention to the embodiments described herein. For example, the flowcharts depict an exact sequence of steps for use in the present invention. The sequence of steps may vary such as, in another embodiment of flowchart 200, steps 205, 210, 215 and 220 may be executed as a part of steps 225, 230–235, 240–245 and 250, respectively. Therefore, the spirit and scope of the present invention should not be limited to the description of the embodiments contained herein.

We claim:

1. An adaptive quality control loop for a wireless communication employing a re-transmission scheme for error correction comprising the steps of:
adjusting a first channel condition threshold associated with a first modulation and coding scheme MCS level used in a transmission of a first data packet in response to any error detection result associated with the transmission of the first data packet if the first data packet belongs to a first category; and
adjusting the first channel condition threshold in response to a last error detection result associated with the transmission of the first data packet if the first data packet belongs to a second category.

2. The adaptive quality control loop of claim 1, wherein the first category includes data packets which are delay sensitive and the second category includes data packets which are delay insensitive.

3. The adaptive quality control loop of claim 1, wherein the last error detection result is either an error detection result that indicates a successful transmission of the first data packet or an error detection result for the last allowable re-transmission of the first data packet.

4. The adaptive quality control loop of claim 1, wherein the first channel condition threshold is adjusted using a fixed step.

5. The adaptive quality control loop of claim 1, wherein the first channel condition threshold is adjusted using a first variable step.

6. The adaptive quality control loop of claim 5, wherein the step of adjusting the first channel condition threshold comprises the step of:
determining the first variable step using a desired MCS error rate for the first MCS level.

7. The adaptive quality control loop of claim 6, wherein the desired MCS error rate for the first MCS level is based on a block error rate target criterion.

8. The adaptive quality control loop of claim 6, wherein the desired MCS error rate for the first MCS level is based on a bit error rate target criterion.

9. The adaptive quality control loop of claim 5, wherein the step of adjusting the first channel condition threshold comprises the step of:
determining the first variable step using a block or bit error rate target criterion and a first data rate associated with the first MCS level.

10. The adaptive quality control loop of claim 1 comprising the additional steps of:
adjusting a second channel condition threshold associated with a second MCS level used in a transmission of a second data packet in response to any error detection result associated with the transmission of the second data packet if the second data packet belongs to the first category; and
adjusting the second channel condition threshold in response to a last error detection result associated with the transmission of the second data packet if the second data packet belongs to the second category.

11. The adaptive quality control loop of claim 10, wherein the first channel condition is adjusted a first step based on an error detection result associated with the transmission of the first data packet, and the second channel condition is adjusted a second step based on an error detection result associated with the transmission of the second data packet.

12. The adaptive quality control loop of claim 1, wherein the first channel condition threshold is adjusted such that the adjusted first channel condition threshold is less than a second channel condition threshold, the second channel condition threshold being a channel condition threshold adjacent to and greater than the first channel condition threshold.

13. The adaptive quality control loop of claim 1, wherein the first channel condition threshold is adjusted such that the adjusted first channel condition threshold is greater than a second channel condition threshold, the second channel condition threshold being a channel condition threshold adjacent to and less than the first channel condition threshold.

14. The adaptive quality control loop of claim 1, wherein a first variable step is determined using an error detection result.

15. The adaptive quality control loop of claim 1, wherein the first channel condition threshold is adjusted based on the last error detection result if the first data packet belongs to the second category.

16. The adaptive quality control loop of claim 15, wherein the first channel condition threshold is adjusted an up step if the last error detection result indicates a failed transmission of the first data packet.

17. The adaptive quality control loop of claim 15, wherein the first channel condition threshold is adjusted a down step if the last error detection result indicates a successful transmission of the first data packet.

18. The adaptive quality control loop of claim 1, wherein the first channel condition threshold is adjusted based on an average of all error detection results associated with any transmission of the first data packet if the first data packet belongs to the second category.

19. The adaptive quality control loop of claim 18, wherein the first channel condition is adjusted an up step if the average of all error detection results indicate that there were more failed than successful transmissions of the first data packet.

20. The adaptive quality control loop of claim 18, wherein the first channel condition is adjusted a down step if the average of all error detection results indicate that there were more successful than failed transmissions of the first data packet.

* * * * *